Feb. 21, 1950 G. H. MOREY 2,498,442
ELECTRICAL HEATER AND METHOD OF MANUFACTURING IT
Filed Dec. 14, 1946 2 Sheets-Sheet 1

INVENTOR.
GLEN H. MOREY
BY Benedict & Swartwood
ATTORNEYS

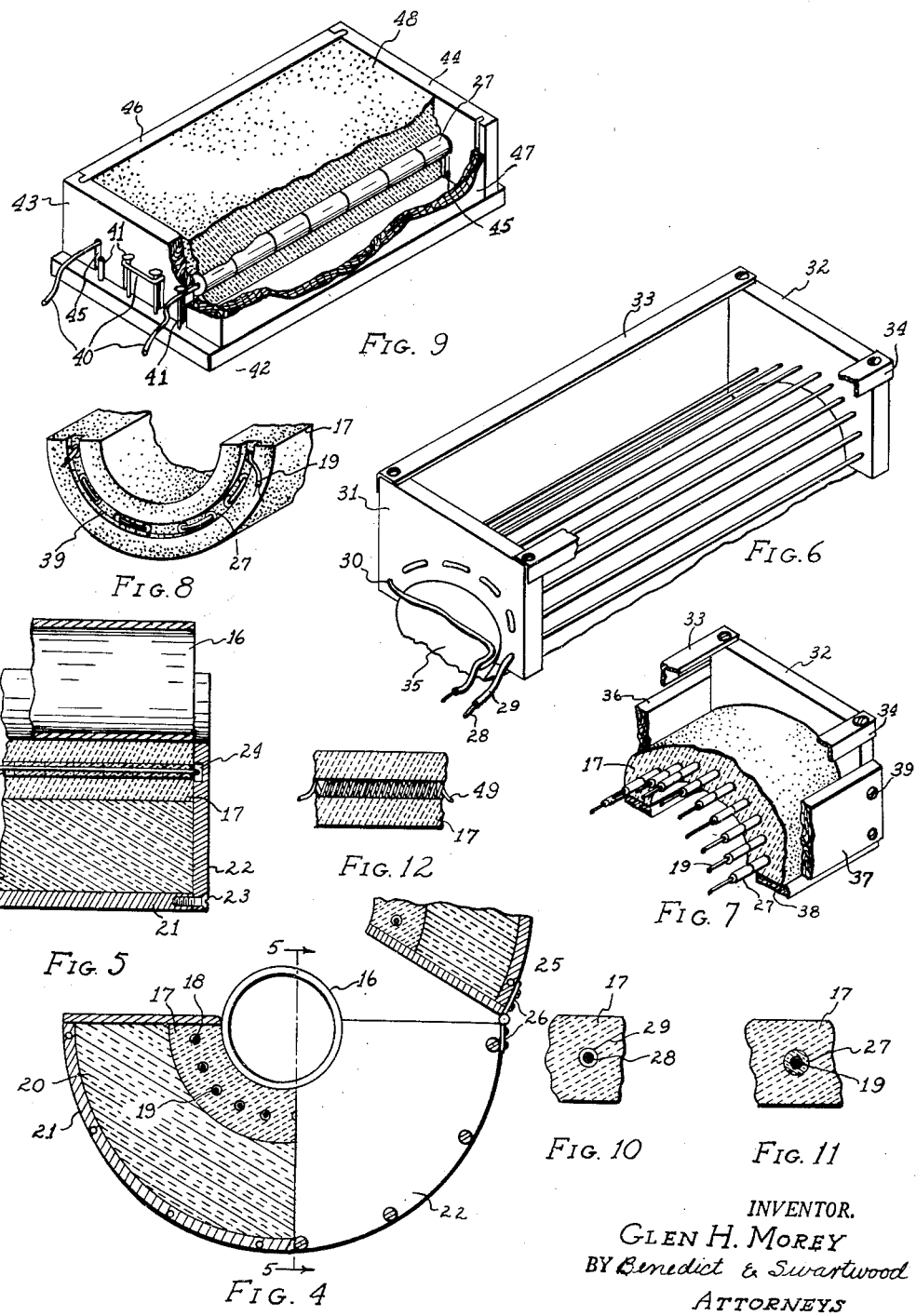

Patented Feb. 21, 1950

2,498,442

UNITED STATES PATENT OFFICE 2,498,442

ELECTRICAL HEATER AND METHOD OF MANUFACTURING IT

Glen H. Morey, Terre Haute, Ind.

Application December 14, 1946, Serial No. 716,357

6 Claims. (Cl. 219—38)

1

This invention relates to an electrical heater and a method of manufacturing it. More particularly, it relates to an electrical resistance furnace useful at high temperatures and to an improved method of incorporating a heating element in a refractory support shaped to conform to the outline of an article to be heated, said element being spaced in a predetermined manner and in non-shorting relationship for heating an article.

It is an object of the present invention to provide a rigid heating element made to conform to the shape of articles of simple or complex outline. It is a further object to provide a method for embedding a metallic resistance heating element in a rigid, supporting, heat-resistant, non-conducting material without leaving the heating element exposed to damaging contact.

It is an object of this invention to provide an electrical furnace capable of high heat output, said furnace being useful in direct contact with an article to be heated, said heater having the resistance elements embedded in a rigid, coherent, heat-resistant material and passing through passageways or tunnels lying generally below the surface from which heat is transmitted to the article being heated, and a further object is to provide a method for making such a heater.

Heretofore, heating elements had been made by cutting or molding open channels or grooves in refractory forms and then placing the electrical resistance element therein. For example, a simple type of hot plate may be made by forming a flat surfaced plate of dense, hard refractory, having a series of grooves cut or molded in one side, and the heating element is inserted into these grooves after the refractory has been baked or burned. This type of heater may be surrounded by a metal cover or shell to form a hot plate upon which the article to be heated is rested. As a rule, these plates operate at comparatively low temperatures, below 500° C. Such elements may also be made in the form of rectangular boxes or cylinders with the resistance element held in spaced relationship by means of grooves or channels. When used in muffle-type furnaces, the heating surface is of the radiant type, in which case the electrical resistance wire is wrapped around the outside of the refractory supporting shell. Insulating material is packed around the outside to cover the wires and insulate the furnace to prevent heat losses and to keep the temperature as uniform as possible. The furnace is then enclosed in a shell.

In certain types of heaters, for example, for

2 heating flasks, a cone-shaped refractory body is made with grooves cut around the outside and resistance wire wrapped around this. The flask is supported above the hot cone.

In other types of furnaces for heating small flasks, a refractory plate with a hole in the center is made to hold the flask above and away from the electrical resistance element, which is exposed. These are constructed in such a way that they cannot be used in contact with the vessel. If in contact, glass vessels would be cracked because of localized overheating, and metal vessels would short out. Such heaters are often shorted out because of the introduction inadvertently of a foreign conducting substance such as scale. Only the bottom of the flask is heated by this type heater. Heating is by radiation.

Flexible heating mantels have also been devised, such as those described in my United States Patent 2,231,506. These are useful at comparatively low temperature operations since the asbestos or glass cloth employed becomes brittle or is destroyed at high temperatures, for example, above 500° C.

In a broad embodiment the invention comprises a heater or furnace comprising a body of rigid, coherent, heat-resistant material permanently shaped to conform to a surface to be heated and having passageways in the form of tunnels therethrough, and an electrical resistance heating element passing through said tunnels, the diameter of said element being less than the diameter of said passageway by an amount greater than the difference in expansion between the element and the heat-resistant material.

In a specific embodiment, the invention comprises a method of manufacturing a heater which comprises forming an envelope or form conforming to the shape and of a size to fit an article to be heated, sewing or otherwise attaching thereto at spaced intervals refractory spacers or holders such as beads or other heat-resistant insulators, and a resistance heating element such as a wire passing through said spacers, embedding the element and refractory spacers in a plastic refractory material such as fire clay cement, asbestos cement or the like, leaving connecting leads exposed, thereafter hardening said refractory, for example by heating, so that it will retain its shape with the heating element embedded therein.

In another embodiment the invention comprises a method of manufacturing a rigid heater or furnace which comprises molding a plastic refractory material around a form having the shape and size of a surface to be heated and forming in said refractory at the time it is molded a continuous tunnel, said tunnel being larger than an electrical heating element to be placed therein, and passing an electrical heating element through the tunnel thus formed.

In another embodiment, the invention comprises a method for forming a heater, which comprises sewing or otherwise forming a fabric envelope, jacket, or form to conform to the outline of an article to be heated, stringing or otherwise attaching beads or other spacers on a heating element, attaching said beads at spaced intervals to the fabric and embedding the beads in a plastic refractory material and thereafter treating it to harden the refractory thereby forming a heater of substantially the shape of the article.

Broadly, the invention comprises a heater having a supporting structure, insulating material therein, a rigid refractory having embedded therein a resistance heating element strung on spaced refractory beads. The heater can also have a fabric lining for the pocket in said rigid refractory said fabric being attached to the spacers.

The heater of this invention has the advantage that it can be made to conform to the outline of an article to be heated so that heat can be uniformly applied. It has the further advantage that it can be made in sections conforming to various parts of an irregularly shaped object and the parts can be assembled around the object after it is in place. For example a valve may be installed in a line, and a heater which is in two or more sections can be applied to cover the valve except for the connecting lines and valve stem. This takes care of a difficult problem encountered where lines and appurtenances thereto must be kept hot.

Another advantage is that the element may be completely embedded in a refractory support preventing short circuits from metal oxide scale, and the like. Moreover, when a glass or asbestos fabric envelope or liner is used, the heater can be used with glass or other fragile articles with greater safety because of the cushioning effect of the fabric.

Not only can the heating element be kept protected at all times since it does not touch the article to be heated, but, because the resistance element lies in a tunnel-like passageway slightly larger in diameter than the element, cracking and spalling of the refractory is avoided. Hence, furnaces for use at high temperatures above 500° C. can be made.

The method of manufacture has the advantage that heaters can be made which could not economically be made before. By this method, irregularly shaped heaters to be placed in or around articles of complementary shape can be supplied. Heretofore this could not be done, at least by any practical method. The heaters can be made in sections and the sections connected in series or in parallel to heat the object. Alternatively, each section can be independently controlled. The method permits the manufacturer to space the element in any desired way so as to put more or less heat into a given part of the article to be heated, depending on special needs. The electrical resistance element is placed at a uniform distance under the surface of the refractory support which lies adjacent the article.

This application describes and claims modifications of the general types of heaters disclosed in my copending application Serial No. 590,845, filed April 28, 1945, now Patent No. 2,419,848 of April 29, 1947.

The use of a combustible fabric envelope during manufacture permits the heater to be made entirely of rigid refractory such as fire clay cement, or the like. This may be desirable in some types of service. The use of a refractory liner protects both the article and the refractory support in which the element is embedded.

Figure 4 is an end view partly in section of a heater or furnace for use with cylindrical articles. Figure 5 is a fragmentary sectional view along the lines 5—5 of the heater shown in Figure 4.

Figure 6 is a perspective view partly in section illustrating one step in the formation of a heater.
Figure 7 is a perspective view partly in section of the heater in a further state of formation.

Figure 8 is a fragmentary perspective view of a completed heating element for use with a cylindrical article.

Figure 9 is a perspective view partly in section of another method of forming a furnace according to this invention.

Figures 10 to 12 are details to illustrate various tunnels and heating elements that may be used.

Referring to the figures, 1 represents a fabric liner for the heater. This liner can be made of flexible fire-proof material such as asbestos fabric, glass fabric, and the like, or it can be made of a combustible material which can be burned away after the heater has been formed into a rigid shape. It can also be a liner of metal, for example, stainless steel, as will be described later.

Figure 1:
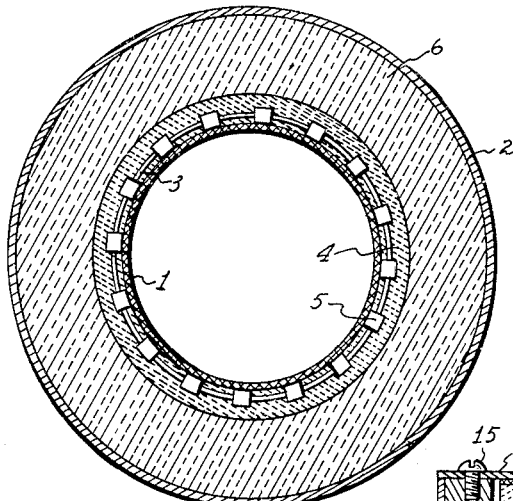
Figure 1 is a horizontal sectional view of one embodiment of the heater useful for heating spherical vessels.

The fabric is sewed or otherwise shaped to conform to the outlines of the surface to be heated. It is illustrated in Figure 1 as a heater to be applied to objects such as round bottomed flasks, but it is contemplated that any shape can be formed. When a fire-proof, non-combustible material is used, the fabric may remain a part of the finished structure. This has the advantage, when glass cloth or asbestos cloth is used, of partially insulating the heater, protecting the refractory support against chipping or cracking, and also serving to cushion the article, which is important from the breakage standpoint when applied to glass or earthenware vessels. If a combustible material is used, it is burned away or otherwise removed after the refractory support has been hardened. In this case, ordinary cloth can be used.

Figure 13:
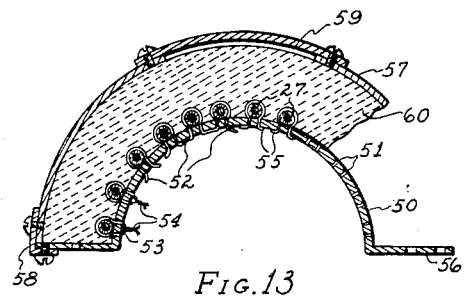
Figures 13 and 14 illustrate another method of forming a heater and various methods of attaching refractory spacers.
Figure 15:
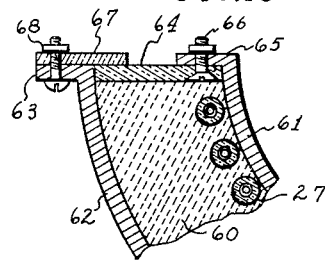
Figure 15 illustrates a section of a finished heater made according to the method of Figures 13 and 14.
Figure 14:
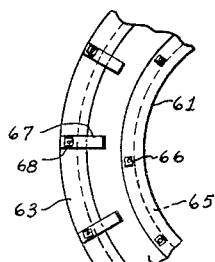

The liner can be formed of a plastic material which is cast or molded into the proper shape from a pattern, or from the article itself, instead of being sewed as is the case with a fabric. The fabric jacket thus formed is then sewed to the heating element. A metal form may be made, for example, by casting, spinning, drawing, punching, hammering, or otherwise suitable means. Means for attaching the heating element and spacers may be provided, for example, as shown in Figures 13 and 15.

The heating element comprises any suitable type of electrical resistance element which is flexible and susceptible of being formed into shapes by bending. In general, it may comprise a wire or a helical coil, although by the use of properly designed refractory spacers, elements in the form of ribbons can be used. The element is strung upon beads which are of a refractory character. The beads may be spaced apart as shown in Figure 1, or can be continuous as shown in Figure 9. Usually the element is attached to the fabric by sewing the beads or other spacers to the fabric at frequent intervals. In this way, the element can be attached in any desired pattern in order to obtain the desired distribution of heat.

Figure 3:
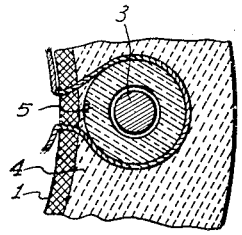
Figure 3 is a detail of the fabric (sewed to the refractory spacer or bead), the heating element, and the refractory support, all in section, and showing the relationship to each other.

The spacer bead can be sewed to the fabric or liner by passing a thread on either side of it around the element and then through the fabric as shown in Figure 3; or by passing the thread through the bead and then through the fabric. Alternatively, the beads or spacers can be sewed to the fabric and the element threaded through them. Instead of beads, refractory clips or other spacers may be used. The spacers may be clipped or sewed to the fabric and the element slipped into place afterward. The beads may be of the shape shown or may be shaped like spaghetti. As shown in Figure 3, the hole in the spacer is larger than the resistance wire. This is desirable since the wire expands at a different rate than the refractory when heated or cooled. The slight oversize permits ready threading of the bead onto the wire and also provides space for expansion of the wire upon heating, thus minimizing the tendency of the furnace to crack or spall due to temperature changes.

The thread used is usually of glass fiber especially when it is desired to maintain the association between the fabric liner or envelope and the beads after the heater is completed. In this way, the threads keep the envelope from being pulled out of place. When a combustible envelope material is used and is to be burned away or otherwise removed after the heater is finally formed, the thread is usually combustible, for example, cotton. Combustible thread can be used in most cases even with the heat-proof liners, since the liner can be held in place by means such as flanges in the completed heater, after the manner shown in Figure 2. The liner rests on the refractory 4 which has been hardened and hence holds the spacers and the heating element firmly embedded. The article to be heated rests on the liner. By the time the heater is ready for use the thread has served its purpose and is no longer needed to keep the elements properly located.

The element is indicated generally as a wire 3 and the bead, or spacer, as 5. Figure 3 shows the bead 5 and wire 3 in cross-section, embedded in a refractory material 4 and with the fabric liner 1 associated with the inner wall or heating surface of refractory 4. It is this surface (or the liner) which lies in contact with the article to be heated. As shown in Figure 3, the heating element is held in place by a loop of thread passed around spacer 5. The refractory, in plastic form, is packed around the spacer and wire, thus embedding them.

Figure 2:
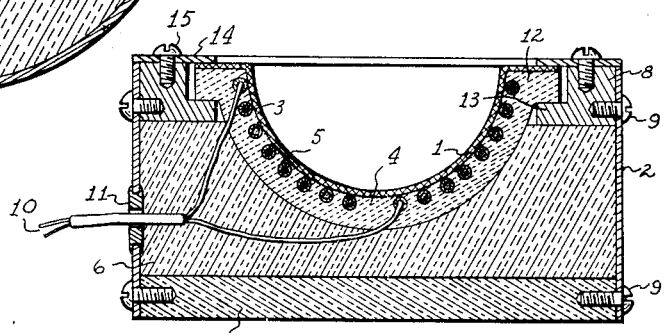
Figure 2 is a vertical sectional view of the assembled heater shown in Figure 1.

Figure 2 shows how a number of turns of heating element may be incorporated in the simple hemispherical shape illustrated. Figure 1 shows the manner in which the wire is maintained in spaced relationship to the liner and the refractory material and how the beads may be spaced from each other. The beads may also be placed side by side forming a continuous tunnel.

The heater and rigid refractory support can be enclosed in a supporting shell comprising a side wall 2 and a bottom piece 7 which can be of steel, asbestos board or other type of refractory or heat-resistant board. A ring 8 is provided at the top of side wall or shell 2. The shell 2 is held to bottom plate 7 and ring 8 by screws 9. Ring 8 is formed from a block of insulation material such as asbestos-gypsum board which is cut in L shape with a ledge 13 to support the heating unit. A circular top plate 14 is placed upon the assembled heater and held in place by screws 15 extending into ring 8. The projecting flanged rim 12 of the refractory heater unit rests on ledge 13 and is held firmly in place by plate 14 which presses on rim 12. When a liner 1 is used, the edges may be turned back and held firmly in place by ring 14 pressing it against rim 12 when the ring is screwed down.

Extending through an insulated opening 11 in one of the side walls are leads 10 to the heating element which are attachable to a suitable source of electric power. The heating element is embedded in the rigid, coherent, heat-resistant nonconductor, herein referred to as the "refractory" 4, so that no part of the element can come in contact with the article to be heated. The element lies below the heating surface of the refractory, that is, below the point of contact between the refractory and the article, even when the liner 1 is not used. The depth to which the resistant element is buried depends upon the thickness and shape of spacer 5.

The apparatus is formed by making the fabric envelope or jacket to conform to the shape of the object to be heated. The heater can be made in sections of more than one differing shape, each corresponding to a segment of the article. In this case the jacket is made to conform to the shape of the part of the article to which it is to be applied. This can be done by cutting darts and taking tucks in cloth and sewing it to shape. Beads 5 are strung on heating element 3 at spaced intervals and are sewed to the fabric. This can be done by looping part of the thread around the individual beads and passing the thread through the fabric as shown in Figure 3. Clips or other fasteners can be used. If they are conductors of electricity they can be removed after the refractory has been hardened. If non-conducting clips are used they can be left in place, and if made of organic material can be destroyed by burning.

When it is desired to heat one particular segment of the article to a greater extent than another segment, the amount of heating element and its distribution can be arranged such as to accomplish this by distributing proportionately more of the element over certain parts of the envelope or form than others, this being done at the time the heater is made. Heaters made to order in this way have a large demand in the chemical industries.

A refractory cement or other plastic or moldable material which can be hardened into a nonconducting, heat-resisting, rigid support, is then molded around the envelope. This can be done by placing a predetermined amount of cement in a vessel having the proper dimensions and then embedding the beads and heating element in the cement by thrusting against the inside of the envelope with sufficient force and over enough area to push the beads into the plastic material and at the same time cause the plastic refractory to take the desired shape. The plastic material can contain a self-setting cement, or can be dried and hardened by heating at a relatively high temperature. It should be of such a consistency that once it has been molded to the desired shape it will maintain its shape until hard. To assist in the embedding operation, a pattern can be made having the shape the heating unit is to take and the fabric can be stretched around it, the refractory being molded to the outside. The plastic refractory can be applied with a trowel, or kneaded around the spacers by hand.

The refractory cement may be of the type of furnace cement that forms a stone-hard mass, such as mixtures of fire-clay, burned fire-clay and a binder such as sodium silicate; or various modifications of such furnace cements, which may contain sand, silica, asbestos, mica, or other refractory substances which are added to modify the physical properties (such as coefficient of expansion, etc.) of the cement; or asbestos cement, which may be powdered, or finely divided asbestos to which a binder such as Portland cement has been added; or modified mixtures of more or less bulky insulating substances such as asbestos, vermiculite or mica, diatomaceous earth, kisselguhr, magnesia, etc., with a binder such as Portland cement. The latter type has the advantage of being rigid, but not hard or stony; having resistance to high temperatures; being an insulator; of light weight; offering a cushioning effect; and being easily handled and inexpensive, thereby reducing costs.

When the beads of spacers and the element have been firmly embedded in the refractory material, it is dried and heated at a high enough temperature so that it takes on a permanent, rigid shape. When the last-described type refractory material is used, as a rule no special care need be taken during the drying step. However, with the hard, stony types, the drying steps must be carefully carried out to avoid checking or cracking of the mass. After drying the heater is heated to a high temperature, preferably above 500° C. This may be done in a furnace, oven or kiln; or may be carried out by means of the embedded heating elements which are attached to a suitable source of electric power. The temperature should be raised gradually, especially in the region of between 250° and 400° C., to avoid damage to the refractory by too rapid drying.

A refractory heating unit containing the element firmly embedded and protected from injury due to short circuits and the like is thus formed. The element may be large or small. It can be incorporated in some other supporting structure or can be used in the form just described. It has great utility, for example to heat reaction kettles of 5–50 gal. capacity, valves, pipe lines, return bends, etc.

The particular heater illustrated in Figures 1 and 2 is assembled by fastening side wall 2 to ring 8, putting the heating unit in place with the rim 12 resting on ledge 13 and clamping it in place by screwing top ring 14 to ring 8. The leads 10 are carried through insulator 11. It is then inverted and an insulating material such as asbestos or magnesia 6 is packed into the interior. Finally, bottom plate 7 is fastened into place.

The insulating material 6 preferably comprises a loose powdered material such as magnesia to prevent the loss of heat from the inside outwardly. Thus, the full benefit of the heater can be economically obtained.

The fabric liner 1 for the article-receiving pocket in refractory 4 can be of ribbed form. This is advantageous when using glass or asbestos fabric, since it tends to absorb mechanical shock. This is especially useful for use with glass or other types of breakable articles which are to be heated. It also protects the refractory material in which the electric element is embedded. Glass or asbestos cloth fabric can be used in heaters for use below about 500° C., but for furnaces operating above this temperature metal liners may be used, or no liner at all.

Although the heaters are particularly adapted to heating the outside of articles, they can also be made to heat the inside. In this case, the fabric can be sewed into the desired shape, turned wrong side out and the element and spacers sewed to it. It is then turned right side out and the plastic refractory applied to the inside, embedding the element and causing the fabric to assume its expanded form. The fabric in this case is on the outside and will lay against the inner surface of the vessel. Heaters for concave surfaces may be made in a similar manner.

Another embodiment of the furnace is shown in Figure 4. This heater may be used to heat a cylindrical vessel or pipe. For example, it may be a portable furnace to be used in connection with annealing butt welds in pipes, which are often welded in place in building pipe lines for oil or gas. By making these heaters in hinged sections they can be placed around the pipe and attached by an extension line to an electric power source.

The cylinder 16 may be a pipe or cylindrical article to be heated. It may also be, for present purposes, a form of the proper size and shape to be used in the various steps of manufacturing the heater.

Around part of the form 16 and conforming to it, is a refractory material 17, the center or heating surface of which is shaped to conform and fit closely to the article 16 when in service. Running longitudinally through this refractory from end to end are tunnels 18 through which electrical resistance wires 19 are passed. These tunnels may be formed in various ways described hereinafter. Insulating material 20 may be placed around the refractory material 17 and the whole heater may be encased in jacket 21, which may be of metal or other suitable material and may comprise suitable means for operatively associating the heater and the article to be heated. An end plate 22 may be attached to the shell 21 by means of screws 23 or other suitable means. A groove 24 may be cut in end plate 22 to correspond to the row of tunnels 18 to permit wire 19 to be passed from one row of tunnels to the next in a continuous manner without touching the end plate 22.

It is also within the scope of the invention to attach a second section generally designated at 25, to the just-described heater by means of hinge 26.

The tunnels may be formed in various ways. For example, one or more refractory beads such as those shown in Figure 9 and designated as 27 may be employed. The holes through these beads are slightly larger than the heating element 19. By using a single long bead or tube, or by placing a number of them end to end, a continuous tunnel to formed. The size of the tunnel is such as to allow for the greater expansion of the wire than of the refractory material 17. The oversize is preferably enough for this purpose with a slight safety factor. As a consequence, when high temperatures are attained, chipping or cracking of the refractory due to the unequal expansion of the metal and the refractory is avoided. Some types of refractory, such as asbestos cement, mixtures of asbestos, vermiculite and cement, and the like, do not split or spall like the hard, stony refractories do. By using a slightly over-size hole through the refractory this difficulty is avoided in all types of refractory. The amount of oversize will depend largely on the temperatures at which the furnace is employed, the character of the resistance, and the actual size of the resistance element. As a rule, a number of beads 27 are used and aligned because in this way a heater of any desired length can be made. One of the greatest advantages of the present method of manufacture is that custom-made or tailor-made heaters can be manufactured at comparatively low cost without the use of dies or molds especially made at great expense for forming each refractory, this being necessary by prior art methods of furnace manufacture. For example, the beads used need not be exactly the length of the heater but by using standard size individual beads, for example, from about ½" to 3" long, a heater of practically any length can be manufactured. As will be seen hereinafter, the remaining materials used can also be standard, thereby cutting tool and overhead costs and reducing the manufacturing problems.

Another method of forming the tunnel is to use a waxed string or wire such as that shown in Figures 6 and 10. In this case, wire or string 28 may be heavily coated with wax 29 or other combustible or preferably low-melting organic substance. The refractory material 17 can be molded around this wire or string as previously described. After the plastic refractory 17 has been dried, the temperature is raised and this causes the wax 29 to melt, leaving a tunnel. The string or wire 28 can be withdrawn from the refractory leaving a tunnel the full length thereof. The heating element can then be inserted into this tunnel.

Alternatively, the wire 28 can be the heating element itself and can be left in place. In this case the heating element is encased with enough wax so that when the unit is heated the wax will run out or be burned out leaving a slightly oversize tunnel through which the resistance element passes. In this way it is unnecessary to remove the wire from the tunnel and replace it with the heating element.

When the waxed wire or cord is used it can be manufactured as follows, referring to Figure 6. The wire 28 covered with wax 29 is passed back and forth through holes 30 in end piece 31. The end piece 31 and the corresponding end piece 32 are held to the proper length by means of spacers 33 and 34, shown as angle irons. The row of holes 30 is arranged so that each is located substantially equidistant from the pipe or cylinder 35, which may be a form in the shape of the surface of the article to be heated, or may be the article itself. This row of holes is located in such a way that when the plastic refractory material is packed around it the waxed wires will be completely covered on all sides with the refractory. This is the preferred way of embedding the wires. It is, of course, possible that a few of the wires be not completely embedded for their full length but the wires should always lie below the surface of the refractory intended to lie in contact with the article, so that the element will not come in contact with the article when it is in place. The end pieces 31, 32 may be semi-circular in shape and may support frame in proper relation to the article 35. These end pieces 31, 32 not only serve to hold the waxed wires in position, but also serve as a mold against which the plastic refractory may be pressed as the wires are embedded. Side retaining members 36 and 37 having a lip 38 may be attached to the end members in any convenient way, for example, by means of screws 39. Thus, the side pieces 36 and 37, the lip 38 and the end pieces 31 and 32 serve as a rough form to retain the plastic refractory material when it is molded around the wires or waxed cord. In Figure 7 the refractory 17 is shown after it has been molded by hand around the heating element. In this figure the wire 19 is shown passing through beads 27. Except for the fact that the tunnels are made by means of the beads in Figure 7 and by means of the waxed wires in Figure 6, the step of packing the plastic refractory in place is the same. Instead of having straight side walls as illustrated in Figure 7, the side retaining member can be curved or shaped in any form desired.

The plastic material, having been molded around the wires, is pressed against form 35 so that the inner or heating surface assumes the exact shape and size of the article to be heated.

The entire apparatus as assembled at this point can be placed in a drying oven and gradually dried in such a manner as to prevent cracking until refractory 17 hardens sufficiently to hold its own shape. At this point the side pieces 36 and 37 can be removed. If the end pieces 31 and 32 form a part of the final heater they can be left in place. If not, they can be removed by cutting the waxed wires 28 at the return bends and heating the mass sufficiently to melt the wax and then withdraw the wires. The refractory after being dried is then heated gradually and over a long period of time in a furnace to further dry and harden it into its final shape. The temperature is ordinarily carried to a point higher than that which will be employed in the final furnace. This is done so as to avoid development at a later date of cracks, crevices or channels due to imperfect heating of the refractory during the manufacturing stage. The temperatures employed are usually of the order of above 1000° C. The resistance heating wires are then passed back and forth through the tunnels, giving the appearance of the heater in Figure 8. A groove or channel can be molded in the end of the piece by adding a simple boss to the end pieces 31 and 32 to protect the wires. This is an alternative to the form shown in Figure 5.

After burning, the hardened refractory may be assembled as shown in Figures 4 and 5.

End pieces 43 and 44 are inserted between the end beads of each string and the nail which secures and supports them. This can be done by cutting slots 45 in the end pieces to permit the board to fit over the cord. This is particularly desirable when the cord 40 comprises the electrical resistance element. Side pieces 46 and 47 are made with tongues to fit into the grooves in end pieces 43 and 44 and to rest upon base piece 42. These are placed in position and the refractory material 48 is packed around the beads as illustrated. The entire assemblage is then dried and may be burned in a separate muffle furnace to the desired high temperature. Alternately, it may be dried until the refractory sets and the side pieces 46 and 47 may then be removed and the ends 43 and 44 removed by sliding them upward. The wires 35 can then be released from nails 41 and the entire heating unit thus formed may be calcined in a separate furnace. Alternatively, if the heating element is used for wires 40 the slack may be taken up by pulling the wire 40 until the wire rests against the end of the massive block of refractory 48. The leads from wires 40 may then be attached to an electrical power source and the heat for calcining the block can be supplied directly in this manner. The heater thus formed in Figure 9 may then be enclosed in a suitable casing, using insulation when needed on all except the heating surface to form a hot plate. When a mixture of asbestos, vermiculite and cement is used, for example, additional insulation may not be needed. If desired, a metal sheet can be placed over the top to form a heating surface not readily damaged. In this way, hot plates for high temperature use can be made.

Figure 9 illustrates another form of the heater and method of making it which is particularly useful for the manufacture of hot plates or segments of heaters which, when assembled, build up a complete heater. In this case a cord or wire 40 may be anchored at one end around nail 41 which may be driven into a board 42 forming the base of the apparatus on which the heater is made. The cord 40 having beads 27 strung thereon, is passed around a similar nail, not shown, at the opposite end of board 42 and back and forth a number of times as illustrated in Figure 9. The cord can be stretched tight. The number of beads placed on the cord is dependent upon the length desired of the finished heater. The cord, being stretched tight, holds the beads in alignment, and the tunnel formed is straight, thus permitting a heating element to be threaded through it at a later time after the cord has been removed. The device also has the advantage that should the heating element burn out or be damaged it can be replaced.

Figure 11 shows an end view of a bead 27 embedded in refractory 17 and having wire 19 passing through the hole in the bead. Figure 12 shows a helical element 49 in a tunnel through the refractory 17.

Referring to Figure 13, a method of manufacturing the heater is illustrated. This method may be used for any form, for example, a segment of a sphere or a cylinder, etc. A form 50 is made to conform to the outline of the surface to be heated. This form may be made of metal or of other material such as plastic. At spaced intervals corresponding to the position in which the heating element is to be fastened are rows of holes 51 which are preferably in pairs arranged in rows corresponding to the path of the heating element in the final heater. A preferred method of attaching the heating element upon which spacers such as beads have been strung, is to pass a thread 52 through one of the holes, around the spacing bead and back through the companion hole of the pair, then on to the next pair of holes, thereby looping the thread around the spacer and holding the spacers against the form 50 in their proper relationship. Another way of doing this is to pass a fine wire 53 through one of the holes, around the spacer and back through the companion hole, and then form a twist 54 to hold the element in position. According to another method, a wire 55, which is sufficiently strong, may be passed through one of the holes, around the spacer and back through the companion hole, and then clinched on the inside surface of form 50. In this way the spacers and the element are positioned in non-shorting relationship according to a predetermined pattern. The form 50 has a flange 56 extending around its periphery. This flange is sufficiently broad to form a heater of the desired thickness. A second form 57 may then be attached to the flange by means of brackets 58. An opening 59 may be left in this outer form in order that the coherent, rigid, heat-resistant non-conductor 60 may be introduced while in plastic form and packed around the spacers and the element as attached to form 50. After this refractory material has been inserted it is set, preferably by drying, until it forms the rigid, refractory non-conducting body of the heater. The means by which the spacers were attached to form 50 can then be cut and form 50 can be removed for use in another operation. The hole 59 can be covered by means of a plate attached in any suitable manner. If there is substantial shrinkage of the refractory away from the form 57 during the drying and heating operation, additional plastic material can be forced in between the shell and the dried body and the drying operation repeated. Alternatively, the outer form 57 can be removed and replaced with a smaller permanent shell.

The form 50 can be removed by removing the bracket 58 and cutting the fastening means. The heater can either be used in this condition, after suitable high temperature heating to insure against cracking, etc., or the form 50 can be replaced with an inner liner which may be of asbestos or glass cloth or other heat-resistant fabric including a metal shell 61 which may have the contour of the vessel or article to be heated. This shell 61 may be of stainless steel or other suitable material. There is no difficulty in this type of heater from shorting out the heating element since the heating element is held embedded in the refractory material 60 and may be completely covered by means of beads 27 over its full length. It is also within the scope of the invention that the spacers be spaced apart from each other as they appear consecutively on the wire. This can be done if an insulating material such as asbestos cement or a mixture of asbestos, mica and Portland cement is used and the wire completely embedded.

The form 57 may comprise a special form for use only in manufacturing the heater or may comprise the outer shell of the heater.

A preferred method of assembling the heater is shown in Figure 15, in which the inner shell 61 is made of metal such as stainless steel. The outer shell 62 is made of aluminum or steel and is also flanged at 63. A heat-resistant material such as Transite board 64 is attached to the flange 65 on inner shell 61 by means of a bolt 66 or other suitable means. The Transite is also held in place by means of clip 67 attached to flange 63 by means of bolt 68. It will be noted that in this case the beads 27 may not be attached to the inner liner 61 in the final heater.

When making simple shapes such as that of a cylinder, the beads 27 can be of any desired length and shape and may extend lengthwise to form a continuous tunnel through refractory 60. In this case the heating element itself can be inserted afterwards. It is also possible to include elongated beads at intervals, said beads extending into the non-conductor and serving to anchor the element more firmly in place. These anchor beads may be held by virtue of the rigidity of the non-conductor, or may be attached to the outer shell by any suitable means. The fact that the tunnels are larger than the heating element has the advantage that the element can easily be replaced in used heaters in which the element burns out.

When manufacturing heaters of a shape such as a segment of a sphere, the heating element must be strung on the beads at the time they are attached to the form 50 in order to be at all a practical method of manufacture.

I claim as my invention:

1. A method of forming a heater which comprises the steps of forming a continuous tunnel in a rigid, heat-resistant non-conductor by molding said non-conductor while in plastic condition completely around a tunnel-forming means and then hardening the plastic material to a permanent shape containing a permanent tunnel-like passage for an electrical resistance element.

2. A method of forming a furnace comprising the steps of arranging tunnel-forming means in a predetermined pattern to form a continuous passageway for a resistance heating element, molding a plastic material capable of setting to a rigid, heat-resistant, non-conducting body completely around said tunnel-forming means, and then hardening the plastic material.

3. The method of claim 2 wherein the tunnel-forming means comprises a continuous line such as a wire coated with wax.

4. The method of claim 2 wherein the tunnel-forming means comprises beads strung on a line such as a wire.

5. The method of claim 2 wherein the tunnel-forming means is attached in predetermined relationship to a form having the shape of the article to be heated.

6. The method of claim 2 wherein the tunnel-forming means is attached to a metal shell having substantially the shape of the article to be heated.

GLEN H. MOREY.

REFERENCES CITED

The following references are of record in the file of this patent:

UNITED STATES PATENTS

| Number | Name | Date |
| --- | --- | --- |
| 926,695 | Frost | June 29, 1909 |
| 1,767,586 | Hudson | June 24, 1930 |
| 1,835,602 | Kercher et al. | Dec. 8, 1931 |
| 2,138,217 | Sutter | Nov. 29, 1938 |
| 2,419,848 | Morey | Apr. 19, 1947 |

OTHER REFERENCES

Krantz et al.: Ind. & Eng'g Chem., December 15, 1940, pages 752–753.